Jan. 28, 1969   R. W. HODGSON ET AL   3,424,072
PHOTOGRAPHIC APPARATUS ON A CAMERA FOR PRODUCING TRANSFER PRINTS
Filed Aug. 19, 1966   Sheet 1 of 6
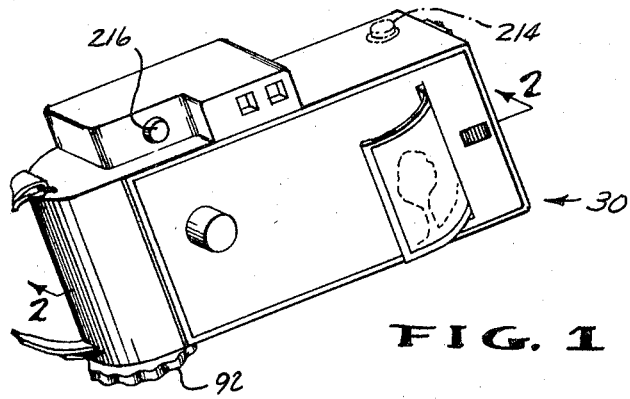
FIG. 1
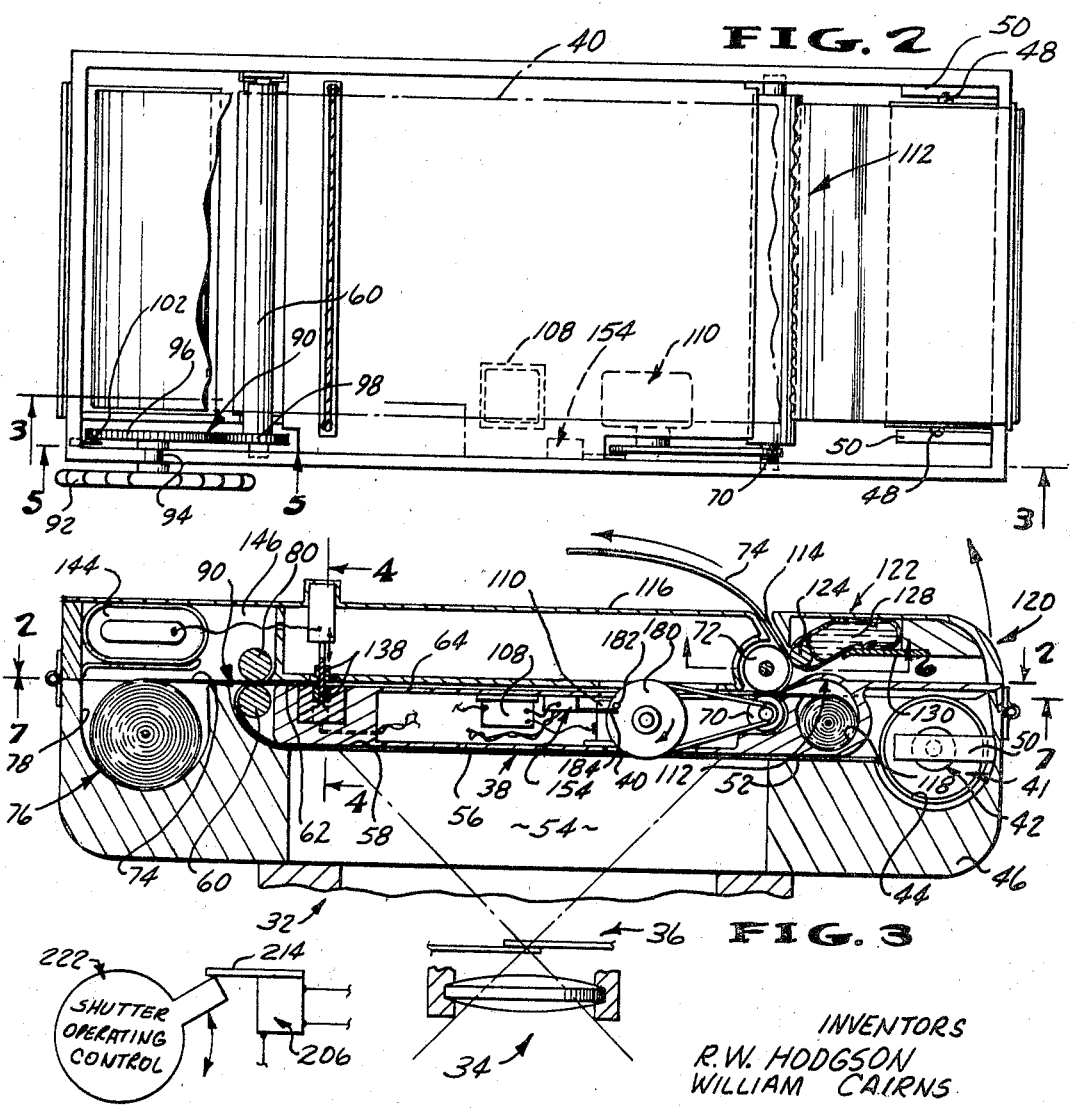
FIG. 2
FIG. 3
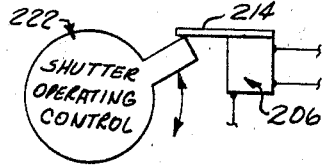
FIG. 10A
INVENTORS
R.W. HODGSON
WILLIAM CAIRNS

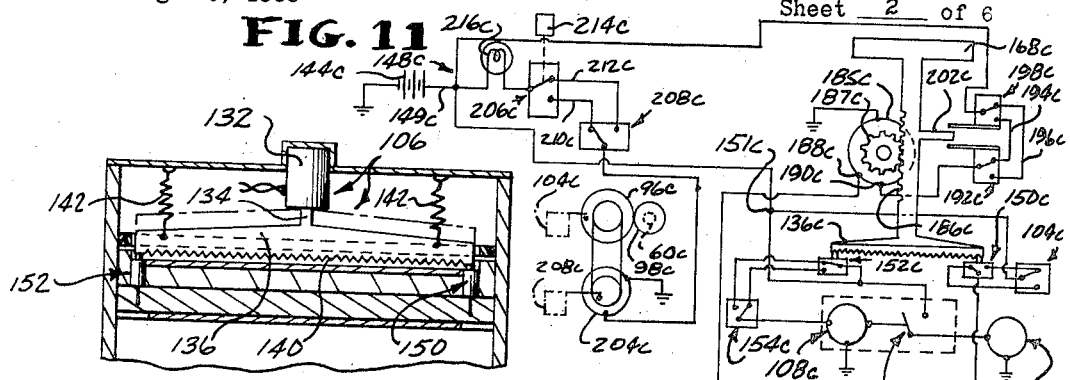
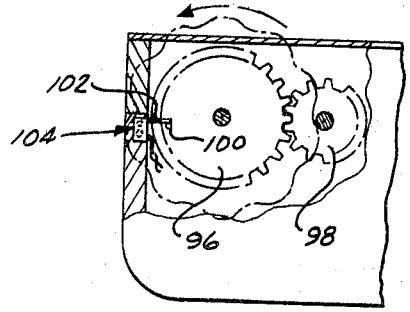
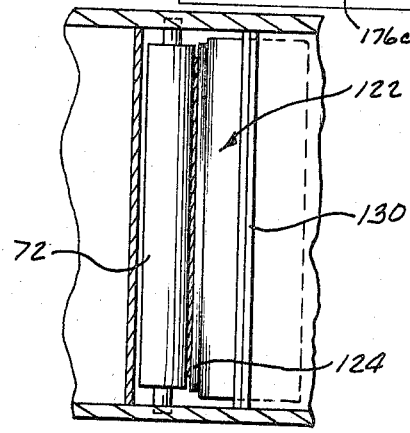
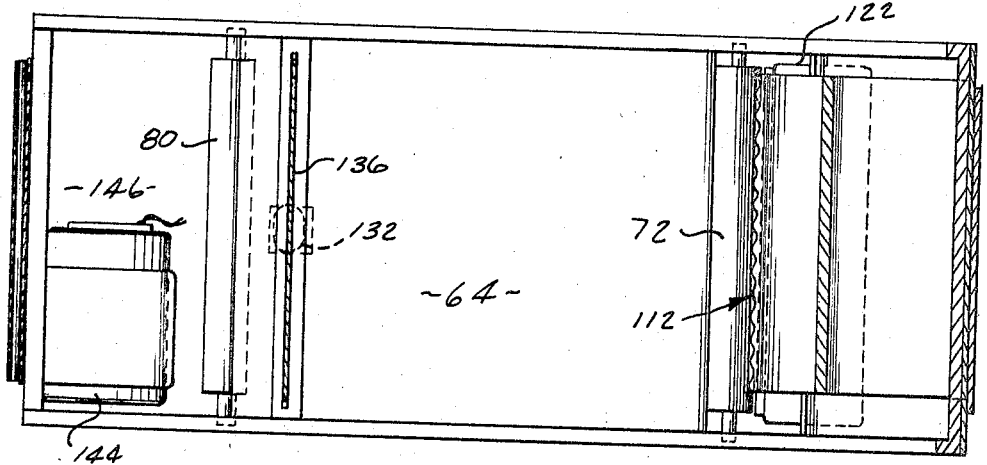

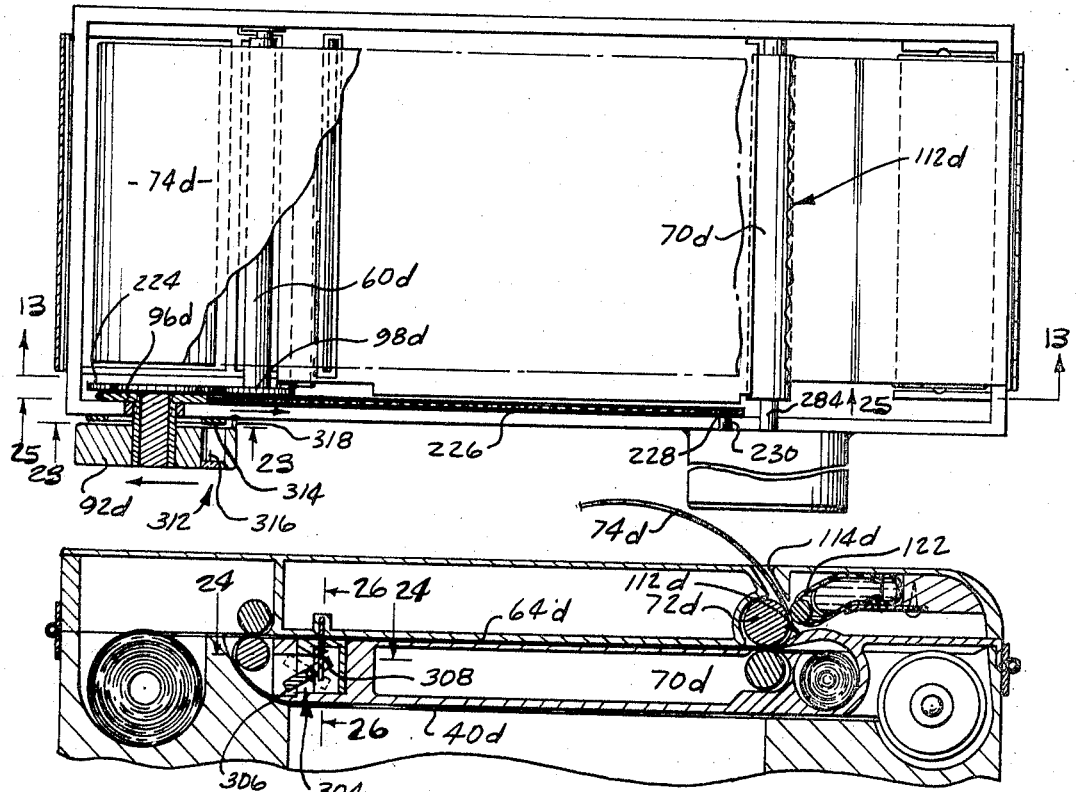
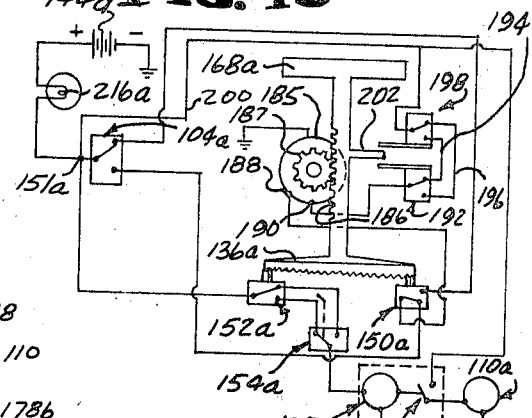
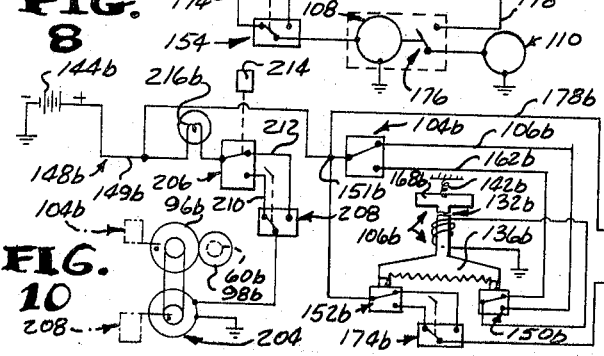
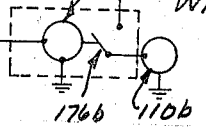

Jan. 28, 1969 R. W. HODGSON ET AL 3,424,072
PHOTOGRAPHIC APPARATUS ON A CAMERA FOR PRODUCING TRANSFER PRINTS
Filed Aug. 19, 1966 Sheet 4 of 6
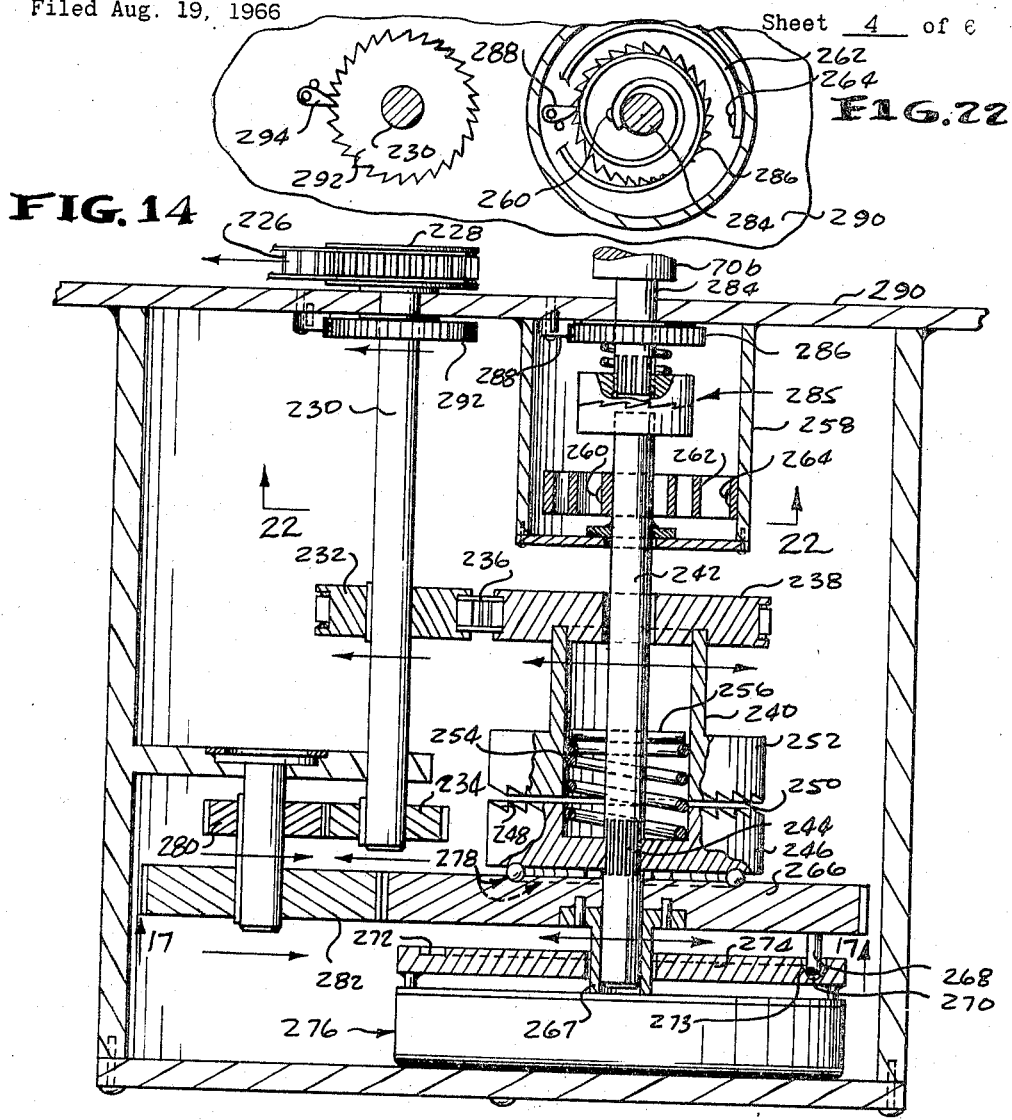
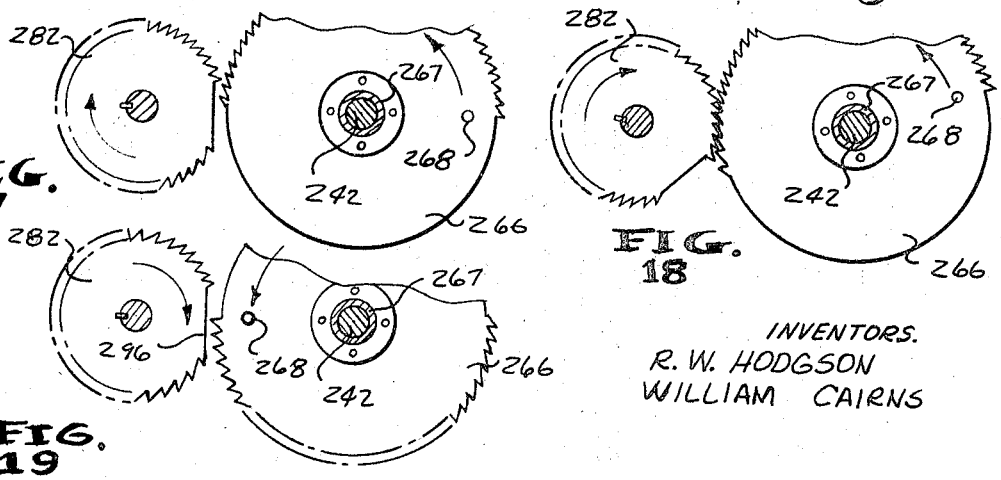
INVENTORS.
R. W. HODGSON
WILLIAM CAIRNS

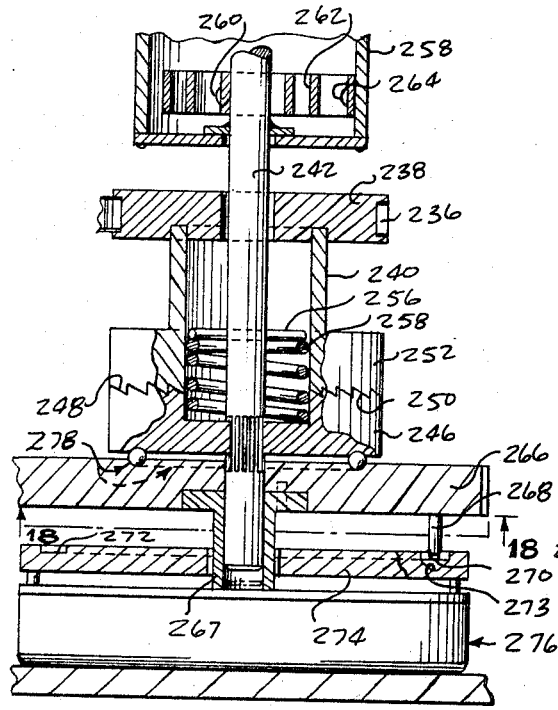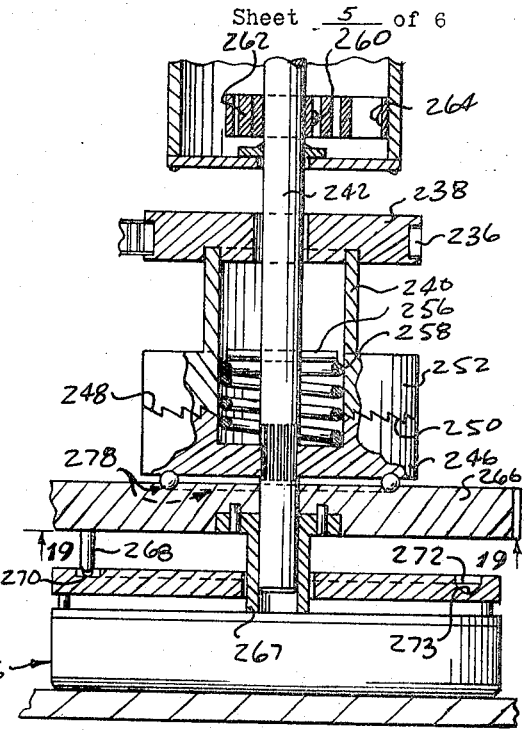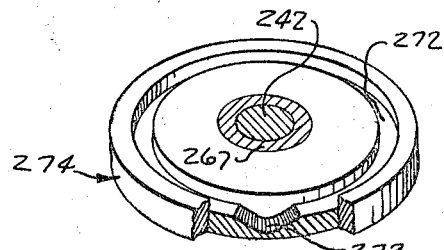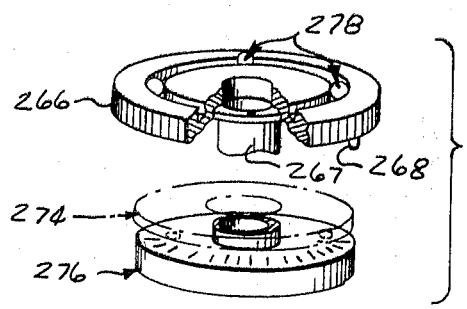

INVENTORS
R. W. HODGSON
WILLIAM CAIRNS

United States Patent Office 3,424,072
Patented Jan. 28, 1969

3,424,072
PHOTOGRAPHIC APPARATUS ON A CAMERA FOR PRODUCING TRANSFER PRINTS
R. W. Hodgson, Los Angeles, Calif. (Box R, Sherman Oaks, Calif. 91413), and William Cairns, 629 S. Burlington Ave., Los Angeles, Calif. 90057
Filed Aug. 19, 1966, Ser. No. 573,671
U.S. Cl. 95—13    17 Claims
Int. Cl. G03b 17/50

ABSTRACT OF THE DISCLOSURE

The specification discloses transfer printing apparatus associated with a camera (such as within the camera, or in an auxiliary unit coupled to the camera, either permanently or temporarily), said camera functioning to expose photosensitive image-recording sheet material in response to operation of the camera, with the transfer printing apparatus being adapted to produce (and, in one preferred form, to also dispense) transfer prints on corresponding image-receptive transfer print sheet material by transfer printing same from each such exposed portion of said photosensitive image-recording sheet material, and to do so without requiring any attention on the part of an operator of the camera as has been required in the past with transfer printing cameras.

---

Generally speaking, the present invention relates to the photographic and camera art and, more particularly, pertains to photographic apparatus comprising a camera of the type wherein a photosensitive image-recording sheet, or portion of a sheet material, is exposed by having an image projected thereon by the lens system of the camera through a temporarily open shutter which is subsequently closed and wherein the latent image recorded on the exposed portion of the image-recording sheet material is subsequently transferred to an image-receiving portion of sheet material by a method of producing photographic transfer prints entirely within a camera, which involves a so-called "dry" process in which a processing liquid is distributed between the area of the photographic image-recording sheet material exposed by the camera to produce a latent image in said area and the corresponding portion of the image-receptive sheet material, which is designed to support a transfer image and which comprises image-forming substances formed by reaction of the processing liquid with the photo-sensitive material of the image-recording sheet, which is then transferred by diffusion to the image-receptive sheet.

Photographic prints customarily comprise a rectangular image surrounded by a blank image-free border, on a rectangular sheet large enough to accommodate both the image and the border. Therefore, when producing such transfer prints by a diffusion transfer process of the type referred to above, it is the usual practice to employ image-recording and image-receiving sheets of approximately the same width and at least equal in width to one dimension of the print including a border of the type referred to above. An area of the image-recording sheet slightly larger than the desired transfer image is exposed to produce an image in the central portion of the area. The image-recording sheet is then normally superposed with an image-receptive sheet and the previously-mentioned processing liquid is effectively distributed between and in contact with an area of the image-recording sheet including the exposed area and a corresponding area of the image-receptive sheet. The border around the transfer image is usually achieved by providing a masking layer, often a separate sheet, positioned between the image-recording sheet and the image-receptive sheet for preventing a transfer of image-forming substances from the image-recording sheet to those areas of the image-receptive sheet which comprise the border thereof. The processing liquid is usually supplied in the form of a frangible container carrying same and positioned in a location adjacent to a transverse edge of the exposed area of the image-recording sheet and is usually distributed from said encapsulated location into a smoothly spread and evenly disseminated relationship between the sheets by moving the sheets in superposition or surface-contacting relationship relative to and between a pair of juxtaposed pressure members (usually pressure rollers). Following distribution of the processing liquid between the sheets, said sheets are retained in superposition for a predetermined period of time during which transferable image-forming substances are produced from photosensitive material (usually the unexposed photosensitive material) in the image-recording sheet and are transferred by diffusion to a layer on the surface of the image-receptive sheet to form a transfer image (usually a positive image having light and dark values corresponding to the original scene photographed by the camera) on the image-receptive sheet. The masking sheet referred to above for providing clear borders on the image-receptive sheet may function for that purpose and, in addition, it may also cooperate in determining the thickness of the layer of processing liquid distributed by the image-recording and image receiving sheets since it acts effectively as a spacer therefor, and, if desired, it may also aid in confining the processing liquid between the edges of said sheets.

The diffusion transfer printing process referred to above is usually of a type which may be said to comprise a diffusion transfer reversal process in which each transferred image effectively comprises a positive print having light and dark values corresponding to those of the original scene photographed by the camera. This is usually achieved by reason of the fact that the diffusion transfer reversal process employs reagents in the processing liquid distributed between the image-recording and image-receptive sheets, which react with the photo-sensitive material to product image-forming substances which are transferred by diffusion to a layer on the image-receptive sheet in an effective image density reversing manner such as to produce such a positive print on the image-receiving sheet. Typical of such processes is silver halide diffusion transfer reversal in which the processing liquid includes a silver halide developer and a silver halide solvent which react with unexposed silver halide of the image-recording sheet to form a soluble silver complex which diffuses into an image-receptive layer on the image-receptive sheet where it is reduced to metallic silver to form a visible positive image. For further examples of processes and materials of this type, reference may be had to U.S. Patents No. 2,543,181, which issued Feb. 27, 1951, and No. 2,662,822, which issued Dec. 15, 1953, both in the name of Edwin H. Land.

While the specific types of diffusion transfer processes referred to above are suitable for use with the present invention, it should be clearly noted that the present invention is not specifically limited thereto but may be employed in association with a variety of different types of developing and/or printing processes where the developing and the printing of the image are achieved within the camera and the print resulting therefrom is to be subsequently used as either a print or a transparency (usually a positive print or transparency) adapted for subsequent direct viewing or projection-type viewing.

It should be clearly understood that, while the present invention is primarily for use with cameras of the type referred to above, the major inventive concept of the present invention does not pertain to the features referred to above, but rather to apparatus for causing the effective sequential performance of the various steps involved in producing and dispensing an in-camera-produced-and-developed print (which shall be interpreted broadly as covering opaque, transparent, and/or translucent prints). In other words, all that is necessary for a user of a camera of the above-mentioned type (when embodying the novel apparatus of the present invention) to do is to take a picture and initiate a printing and dispensing operation which will be completely performed in properly timed sequential relationship by the apparatus of the present invention and which will result in the dispensing from the interior of the camera into a removal position exterior thereof, either for direct manual removal or for reception in a storage container or tray, of a finished, fully-developed and fully-processed print, thus eliminating the multiple operations which must now be performed by the person using the camera after taking a picture in order to produce and remove such a transfer print.

In connection with the above, it should be noted that most cameras of the prior art type referred to above require that an operator first take a picture or make an exposure. Then the operator is required to manually move the image-recording sheet into superposed relationship with respect to the image-receiving sheet and to, at the same time, spread the processing liquid therebetween. This is usually accomplished by pulling an end tab of one or the other or both of the effectively joined strips of sheet material comprising the image-recording and the image-receiving sheets, or otherwise moving same, so that they will be drawn through a pair of pressure rollers inside of the camera which will crush the frangible container carrying the processing liquid and which will then spread the processing liquid between the two sheets, including the exposed area of the image-recording sheet and corresponding area of the image-receiving sheet, which will then, after completion of said manual tab-pulling operation or other manual advancement operation, lie in what might be termed a diffusion transfer printing region, usually within the closed back of the camera, although not necessarily so in all forms of the prior art cameras. The juxtaposed or superposed sheets, with the processing liquid therebetween, must remain in said condition for a period of time which is usually determined by the operator counting off a certain number of seconds, after which it is necessary for the operator to manually separate the superposed sheets of strip material so that the newly-transferred image on the surface of the image-receiving sheet can be retained as the finished print and so that the used image-recording sheet can be thrown away. This also requires that both of said sheet portions be detached or separated from the remainders thereof which are still positioned within the camera.

The above-mentioned several manual operations required in such prior art cameras of the type referred to above are disadvantageous for several reasons. First, there is considerable variation in the actual time interval which different people will count off. This is based upon the vagaries of human nature and leads to variation in the quality of the transfer print produced. Second, the stripping or separating operation wherein the transfer print is separated from the closely surface-contacting used image-recording sheet portion which was originally exposed by the lens system of the camera is a somewhat critical operation in that if the separation achieved by manually pulling apart joined ends of the two strip material portions is done either too rapidly or at the wrong included angle of relative movement thereof, some of the still-relatively-soft surface material bearing the image on the surface of the image-receiving sheet portion may be wholly or partially stripped away from the base thereof, thus damaging the image. It is desirable that this stripping operation be optimized so as to be performed at the same time rate and same relative movement angle (both of which are optimum) each time the operation is performed, and yet this is certainly not done when the stripping operation is manually performed in the conventional prior art manner. Also, it is often thought desirable to apply a finish coating to the image-bearing surface of the transfer print. This is conventionally done in prior art practice by rolling, brushing, or otherwise applying to the image-bearing surface of the transfer print a liquid finishing material which is usually a liquid plastic material which may merely provide a protective surface coating or which, in certain cases, may carry therein chemicals adapted to react with the still-soft surface of the image to render it more permanent. This finishing operation is performed quite differently by different operators and sometimes is performed so carelessly as to fail in its desired purpose—that is, of protecting the surface of the freshly-produced transfer print. In fact, in some cases the still-soft surface of the transfer print is actually damaged by the attempted finishing operation when clumsily done through the inept manual application of the finishing liquid to the surface of the print.

It is obvious that it is desirable to standardize and optimize all of the above-mentioned operations in connection with the conventional prior art print-making process, and this is precisely what the apparatus of the present invention does. It removes all variability from each of the processing steps mentioned above and performs them all in proper timed sequence and in a completely optimum manner within the camera and then dispenses the fully-finished print into a removal position.

It is understood that the apparatus of the present invention is suitable for use in either black-and-white photography or color photography and that it is also suitable for use with cameras employing other means for storing and disseminating the processing liquid differing from the prior-art type mentioned above carrying frangible processing liquid containers at appropriate spaced locations along the length of the image-recording sheet of material. For example, the apparatus of the present invention can be very readily adapted to employ a processing liquid dispensing apparatus arrangement and method of a type such as is more fully disclosed in U.S. Patent No. 3,254,582, which issued June 7, 1966, in the name of Nan Guthrie Budde, and all such arrangements are intended to be included and comprehended within the broad scope of the present invention.

With the above points in mind, it is an object of the present invention to provide photographic apparatus for exposing photosensitive image-recording sheet material (usually small areas thereof for each individual exposure) and for producing and dispensing prints therefrom on corresponding portions of image-receptive sheet material in an optimized manner through the operation of the apparatus of the present invention, which will cause the complete optimized printing process to occur, followed by the dispensing of the finished print into a removal position for manual removal or reception by any suitable carrying or storage container, if desired.

It is a further object of the present invention to provide apparatus of the character referred to herein generically and/or specifically and individually or in combination and having any or all of the advantages and/or features referred to herein, either individually or in combination.

Further objects are implicit in the detailed description which follows hereinafter (which is to be considered as exemplary of, but not specifically limiting, the present invention), and said objects will be apparent to persons skilled in the art after careful study of the detailed description which follows hereinafter.

For the purpose of clarifying the nature of the present invention, several exemplary embodiments of the invention are illustrated substantially, fully, or in part in the hereinbelow-described figures of the accompanying five sheets of drawings and are described in detail hereinafter.

FIG. 1 is a greatly-reduced-size, perspective view of one exemplary embodiment of the invention as seen from a position slightly above and to the rear of same, and this view illustrates the dispensing of a fully-finished transfer print into a manual removal position.

FIG. 2 is a somewhat-larger-scale view taken substantially along the plane and in the direction indicated by the arrows 2—2 of FIG. 1 and of FIG. 3 and essentially shows the apparatus from the rear with the back wall opened up to show certain portions of the apparatus of the present invention normally enclosed therewithin.

Figure 25:
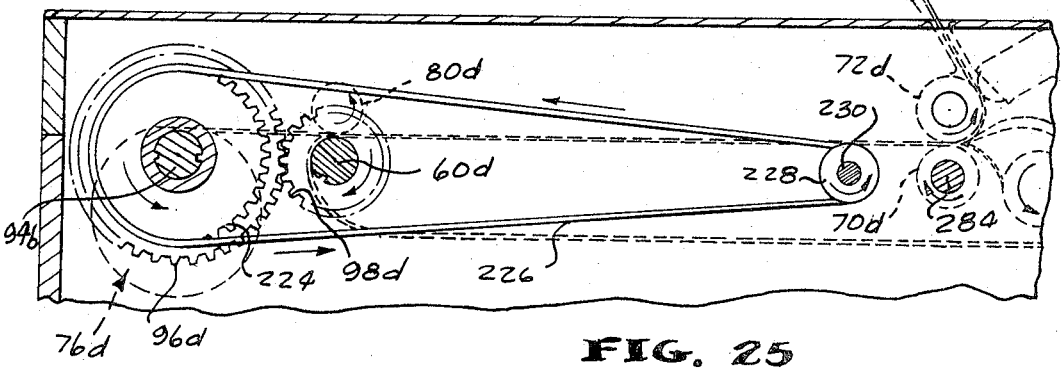

FIG. 3 is a fragmentary, partly-broken-away sectional view taken substantially along the planes and in the direction indicated by the arrows 3—3 of FIG. 2. It should be understood that all forward portions of the camera lens system, shutter and related structures are largely broken away and not shown in this view since such structures are entirely conventional and are well-known in the art. It should be noted that the detachment means is shown in operated relationship in this view, although in actuality it would be in unoperated, ineffective relationship when the auxiliary transporting and dispensing means has just completed the transporting and dispensing of a finished print into an exterior removal position, as is shown in FIG. 3. This is done for the purpose of providing a maximum disclosure of both of said features of the invention in a single view.

FIG. 4 is a fragmentary, partially-broken-away view taken substantially along the plane and in the direction indicated by the arrows 4—4 of FIG. 3 and illustrates one exemplary form of the detachment or detaching means for effectively detaching the surface-contacting superposed image-recording and image-receiving sheet portions positioned in the diffusion transfer printing region from the remainder thereof so that they can be dispensed into a position exterior of the camera for manual removal in a manner such as is indicated in FIGS. 1 and 3.

FIG. 5 is a fragmentary, partially-broken-away view taken substantially along the plane and in the direction of the arrows indicated at 5—5 of FIG. 2 and illustrates an interior portion of the manually operable main transport means of one exemplary embodiment of the invention.

FIG. 6 is a fragmentary, partially-broken-away view taken substantially along the plane indicated by the arrows 6—6 of FIG. 3 and illustrates a portion of the auxiliary transporting and dispensing means adjacent to the egress slot means where a severed transfer print is dispensed from within the camera to a manual removal position such as is shown in FIGS. 1 and 3 and, in the process of being ejected, has a protective surface coating applied thereto. This occurs immediately after the stripping operation wherein the used image-recording sheet portion is stripped away from the newly-transferred image carried by the image-receiving sheet portion and is stored in a storage chamber for subsequent removal and disposal when new strip-type rolls of the image-recording sheet material and the image-receiving sheet material are placed in the camera.

FIG. 7 is a view taken substantially along the plane and in the direction indicated by the arrows 7—7 of FIG. 3 and illustrates further features of the invention lying above said plane, which is at the same level as the plane of FIG. 2.

FIG. 8 is a fragmentary, somewhat diagrammatic electric schematic view illustrating the electrical aspects of the exemplary first embodiment of the invention physically illustrated in FIGS. 1–7 inclusive.

FIG. 9 is a view very similar to FIG. 8 but illustrates a slightly modified form of the invention.

FIG. 10 is a view similar to FIG. 8 but illustrates a further modification of the FIG. 8 form of the invention.

FIG. 10A is a fragmentary view illustrating a very slight modification at the operative input end of the FIG. 10 form of the invention wherein the initiating pushbutton is effectively coupled to and/or operated by a conventional camera shutter control mechanism in a manner such as to operate the pushbutton of the FIG. 10 form of the invention substantially coincident with, or immediately after, closure of the camera shutter.

FIG. 11 is a view similar to FIG. 9 but illustrates a further modification of the FIG. 9 form of the invention.

FIG. 12 is a partially-broken-away view similar in many respects to FIG. 2 but illustrates a modified form of the invention which does not employ electrical energy for sequencing and operating in the proper timed relationship the various elements of the apparatus. In the FIG. 12 form, all portions of the apparatus are mechanically powered and/or operated.

FIG. 13 is a view taken substantially along the plane and in the direction of the arrows 13—13 of FIG. 12 and is very similar to FIG. 3 of the first form of the invention but, of course, illustrates the second form of the invention of FIG. 12 wherein mechanical power, only, is employed for operating the various elements of the invention.

FIG. 14 is an enlarged fragmentary view of the means for operating the auxiliary transporting and dispensing means and the timer means controlling same of the modified mechanically-operated form of the invention illustrated in FIG. 12. This view is taken substantially on a central horizontal sectional plane, although certain portions are shown in elevation and certain portions are shown partially in elevation and partially broken away into a sectional plane. This view illustrates said portion of the apparatus immediately before the main operating means has been manually operated to the proper extent for advancing a previously-exposed image-recording sheet portion into surface-contacting superposed relationship with respect to an image-receiving sheet portion in the diffusion transfer printing region.

FIG. 15 is a fragmentary view of a portion of the apparatus shown in FIG. 14 after manual operation of the main transport means has begun and has advanced the joined image-recording and image-receiving sheet portions a very short distance into the diffusion transfer printing region. It will be noted that this short distance of operation of the apparatus from the FIG. 14 configuration into the FIG. 15 configuration has caused engagement of the previously-disengaged gears effectively connected between the main transport means and the spring motor of the auxiliary transporting and dispensing means whereby to begin to positively wind and tension said spring motor and that also driving engagement of the main transport means with respect to the timer means controlling delayed activation of the auxiliary transporting and dispensing means has also occurred and will continue till the apparatus reaches the configuration shown in FIG. 16 when the release of said timer will occur.

FIG. 16 is a fragmentary view generally similar to FIG. 15 but shows the apparatus substantially at completion of the operation of the main transport means and the moving of the joined image-recording and image-receiving sheets into the diffusion transfer printing region and also substantially at completion of the winding and tensioning of the spring motor of the auxiliary transporting and dispensing means and substantially at a position for disengagement of the main manually-operated transport means from the timer means controlling the delayed operation of the auxiliary transporting and dispensing means, thus freeing said timer means for activating operation after a predetermined time interval has elapsed.

FIG. 17 is an enlarged fragmentary view taken substantially in the direction of the arrows 17—17 of FIG. 14 and illustrates only the two gears connecting the main transport means and the timer means.

FIG. 18 is a view similar to FIG. 17 but is taken on a plane such as that indicated partially by the arrows 18—18 of FIG. 15.

FIG. 19 is a view similar to FIGS. 17 and 18 but is taken on a plane such as that indicated partially by the arrows 19—19 of FIG. 16.

FIG. 20 is a fragmentary, partially-broken-away perspective view of the cammed-surface raceway carried by the outer surface of the timer and which causes engagement and disengagement of the facing annular gears effectively connected between the main transport means and the spring motor of the auxiliary transporting and dispensing means and, in effect, comprising a part of said auxiliary transporting and dispensing means.

FIG. 21 is an exploded perspective view of a conventional timer of a type well-known in the art and which has been modified slightly to provide the timer illustrated in FIGS. 14–16, this modification comprising the replacement of the conventional timer index member (conventionally carried by a perpendicular shaft) with the right hand one of the timing gears of the timing means fragmentarily illustrated in FIGS. 17, 18, and 19, and the replacement of said conventional shaft with the sleeve shown connected to said right hand gear and adapted to extend within the housing of the conventional timer shown in FIG. 21 for connection to the interior spring, escapement, balance wheel staff, and conventional timing, clock, and/or watch mechanism contained therein which is well-known in the art and which is, therefore, not shown in detail.

FIG. 21A is a front elevational view of a conventional timer prior to the very slight modification thereof embodied in the showing of FIG. 21.

FIG. 22 is a cross-sectional view taken substantially on the plane indicated by the arrows 22—22 of FIG. 14.

Figure 23:
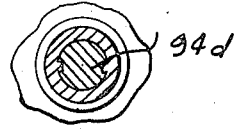

FIG. 23 is a fragmentary view taken substantially along the plane and in the direction indicated by the arrows 23—23 of FIG. 12.

Figure 24:
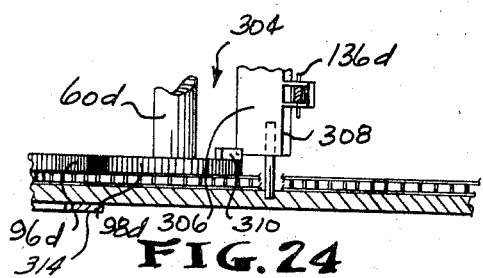

FIG. 24 is a fragmentary cross-sectional view taken substantially along the plane and in the direction indicated by the arrows 24—24 of FIG. 13 and illustrates a portion of the mechanically-powered and non-electrically-powered form of the detachment means for separating the joined surface-contacting image-recording and image-receiving sheet portions lying in the diffusion transfer region from the remainder thereof.

FIG. 25 is an enlarged fragmentary view taken substantially along the plane and in the direction indicated by the arrows 25—25 of FIG. 12.

Figure 26:
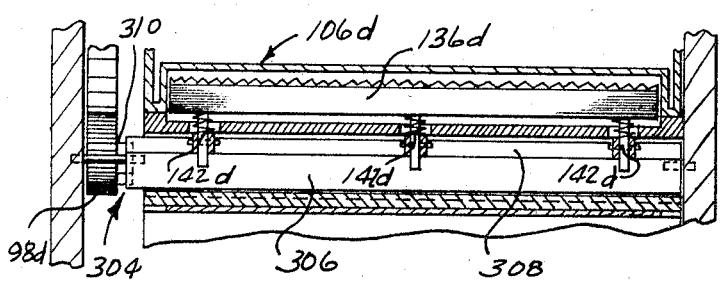

FIG. 26 is an enlarged fragmentary partially-broken-away view taken substantially along the plane and in the direction indicated by the arrows 26—26 of FIG. 13.

Figure 27:
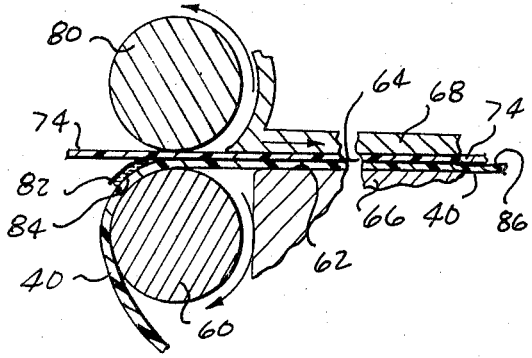

FIG. 27 is an enlarged, fragmentary, partially-broken-away view similar to a left portion of FIG. 3 or a left portion of FIG. 13 where the capstan drive and opposed idler pressure roller are positioned and which cooperate together to function as a part of the main transport means for transporting and at the same time effectively surface-joining corresponding end portions of the image-recording sheet and the image-receiving sheet and simultaneously crushing the frangible container carrying the processing liquid referred to hereinbefore so that it will be evenly disseminated and spread through the interfacial junction region of the two surface-contacting sheet portions by the time they have been fully transported into the diffusion transfer printing region. FIG. 27 shows the processing liquid-containing capsule before it is crushed.

Figure 28:
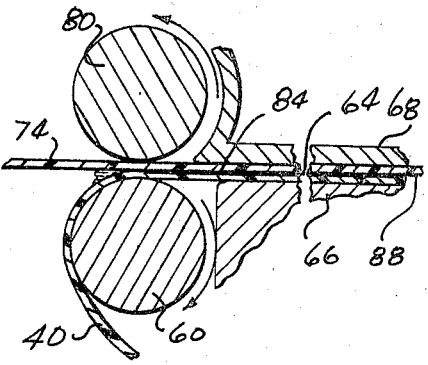

FIG. 28 is a view similar to FIG. 27 but shows the apparatus after the joined sheet portions have been substantially advanced toward the right from their positions shown in FIG. 27, thus bringing about the crushing and collapsing of the processing liquid container and the spreading of the processing liquid between the image-recording sheet portion and the image-receiving sheet portion as is clearly shown fragmentarily in this figure.

Generally speaking, the apparatus of the present invention is normally embodied in a camera, such as is generally designated by the reference numeral 30, which comprises a camera housing normally having a front portion, such as is shown fragmentarily broken away at 32 in FIG. 3, which is normally provided with a lens system, such as is fragmentarily and somewhat diagrammatically indicated at 34, and a shutter system such as is also diagrammatically and schematically illustrated at 36. The arrangement is such that a suitable shutter operating lever (not shown), such as is well-known in the art may open the shutter 36 for any desired period of time to allow light from an object to enter the light-tight interior of the front of the camera 32 by way of the lens system 34 so as to be focussed in an image-recording zone or area, which is generally designated at 38 in FIG. 3, where a portion of an image-recording sheet 40 is adapted to be positioned so as to be exposed to light from a photographed object whereby to form a latent image in the light-sensitive material carried by the front surface of the image-recording sheet portion 40.

The image-recording sheet portion 40 is illustrated as being in the form of a longitudinal strip of sheet material initially supplied in the form of a roll thereof on a spindle or spool, such as is indicated at 42, which is adapted to be removably positioned within the cavity or storage region 44 formed within the rear body portion 46 of the camera 30. Usually the supply spool 42 is resiliently held in the recess or cavity 44 by reason of mounting of spindle ends 48 in resilient mounting end bracket members 50. However, any suitable mounting means may be employed. Also, suitable back friction means for providing a desired degree of tension on the film may be employed, if desired, and since such are well-known in the art, no specific detailed disclosure thereof is made in the drawings or specification.

The free end of the image-recording sheet 40 is drawn from the supply spool 42 and is fed through a first narrow slotted opening 52 into the large central opening 54 where it lies immediately forward of, and in surface engagement with, the support panel 56 which, in some cases, may be slightly convex toward the camera lens 34 so as to maintain positive supporting surface contact with the image-recording sheet portion 40 over substantially the entire rear surface thereof.

The extreme forward free end of the image-recording sheet 40 is fed through another narrow slot 58 and extends into a position where it passes around a driving capstan roller 60 and then reverses direction and passes through another narrow slot 62 into the very thin substantially rectangular diffusion transfer printing recess 64 which is defined between two adjacent panel members 66 and 68 and which may be said to comprise a diffusion transfer printing region.

The extreme forward end of the image-recording sheet 40 extends completely through the diffusion transfer printing region or recess 64 into a position between an auxiliary drive capstan 70 and an opposed pressure idler roller 72 and throughout said diffusion transfer region or recess 64 and, in fact, all the way from the main driving capstan 60 to the auxiliary driving capstan 70, said image-recording sheet portion 40 is adapted to be in superposed surface-contacting relationship with respect to a corresponding portion of an image-receiving sheet 74 which joined said previously-mentioned image-recording sheet 40 as it passed around the previously mentioned main driving capstan roller 60. Said image-receiving sheet material 74 is usually supplied in the form of a roll, such as is generally designated by the reference numeral 76, which is adapted to be removably positioned in a recess or cavity 78 formed in the opposite end of the camera body 46 from the previously-mentioned storage recess 44 for the image-recording sheet material 40 in the form of the previously-mentioned supply roll thereof.

Said roll 76 of image-receiving sheet material 74 may also be mounted on a spindle similar to that illustrated at 42 as mounting the image-recording film roll 41 or it may be provided in the form of a roll having no projecting spindle but having an egress opening through a cover therefor allowing the free end of the image-receiving sheet material 74 to extend outwardly therefrom in a manner similar to that shown in FIG. 3. In fact, either of the supply rolls 41 or 76 may be of either of the types just mentioned and/or may be enclosed and effectively sealed in a protective (and, in certain cases, light-tight) manner, if desired.

It will be noted that the free end of the image-receiving sheet material 74 is threaded between the previously-mentioned main driving capstan 60 and the opposed pressure idler roller 80 so as to have its diffusion transfer printing surface lying in face-to-face contact with the previously-exposed photosensitive emulsion surface of the image-recording sheet 40, thus causing them to be forcibly pressed together and fed into the very confining previously-mentioned diffusion transfer printing recess or region 64 until such time as the complete area of the previously-exposed image-recording sheet portion 40 lies in said diffusion transfer printing recess or region 64 in superposed contact with the corresponding portion of the image-receiving sheet material 74, as is shown fragmentarily in FIGS. 27 and 28 drawn to a substantially larger scale than FIG. 3, which shows said sheets 40 and 74 after they have been substantially moved out of the diffusion transfer printing region 64.

It will be noted that, in the example illustrated, the image-recording sheet 40 has spaced at a location corresponding to a marginal side edge of the exposed portion thereof (and at a plurality of sequential similar locations relative to later exposures to be made), a frangible or collapsible container 82 (not shown in FIG. 3 because of the small scale thereof) which carries therein a processing liquid 84 and which is effectively forced out of the collapsed container 82 and is evenly disseminated and spread over substantially the entire area of the opposed surfaces of the exposed portion of the image-recording sheet 40 and the corresponding portion of the image-receiving sheet 74, as is best shown in sequence in FIGS. 27 and 28. The processing liquid 84 then acts to transfer by diffusion a visible print of the latent image from the exposed surface 86 of the image-recording sheet 40 to the diffusion transfer printing surface 88 of the image-receiving sheet 74 by well-known diffusion transfer reversal printing processes of the type referred to hereinbefore. This normally requires a predetermined period of time, such as of the order of ten seconds, for example, and, therefore, it will be noted that the superposed image-recording sheet 40 and image-receiving sheet 74 in the diffusion transfer printing region 64 are arranged to be positioned therein for the required printing interval of time by the apparatus of the present invention.

The main capstan roller 60 and, of course, the opposed idler pressure roller 80 comprise a major portion of what might be termed the main transport means for transporting the two free ends of the sheet material 40 and 74 both insofar as causing them to be withdrawn from the corresponding supply rolls 41 and 76, and with respect to positively feeding them in the above-described superposed relationship into the above-mentioned diffusion transfer printing recess and region 64. In the example illustrated, said main transport means is generally designated by the reference numeral 90 and is manually operable by the operating knob 92 which is coupled by shaft 94 to first gear 96, which drives second gear 98 connected to said main driving capstan roller 60.

In the process of rotating the manually operable knob 92, it will be noted that a switch-operating pin 100 strikes the toggle arm 102 of the snap-action two-position switch generally designated by the reference numeral 104, as best shown in FIGS. 5 and 8. This functions in a manner which will be explained in greater detail hereinafter to cause the operation of the detachment means, which is generally designated by the reference numeral 106 as is perhaps best shown in FIG. 4, so that it will cut the rear ends of the superposed image-recording sheet 40 and image-receiving sheet 74 at what amounts to the rear end of the diffusion transfer printing recess or region 64. After the severing operation is completed, the detachment means 106 returns to its normal inoperative position in a manner which will be described hereinafter and simultaneously with the operation of said detachment means 106, a time delay relay such as is indicated at 108 in FIG. 8 is energized, which will operate after a predetermined time delay (usually of the order of ten seconds in the case of a black-and-white diffusion transfer printing operation or of the order of 60 seconds in the case of a color printing operation, although not so limited), to in turn energize the auxiliary motor 110, which will transport the joined sheets of material 40 and 74 after completion of the diffusion transfer printing operation toward the right as viewed in FIG. 3 and between the auxiliary capstan drive roller means 70 driven by said auxiliary motor 110 and the opposed pressure idler roller 72, at which point the two sheets of material 40 and 74 are effectively separated or stripped one from the other by the stripping or separating means, generally designated by the reference numeral 112, comprising a curved blade having a plurality of fingers positioned at exactly the right angle to be inserted between the right hand free end of the strip of used image-recording material 40 and the right hand free end of the printed image-receiving material 74 so as to effectively separate same and allow the printed free end 74 of the image-receiving material to pass around the pressure idler roller 72 and out an egress slot means 114 in the back 116 of the camera 30 to a removal position exterior thereof, as is clearly shown in both FIGS. 1 and 3.

The separated used image-recording sheet material 40 is fed from the capstan roller 70 and pressure idler roller 72 into the waste storage chamber 118 where it tends to form in a roll, either of a coreless type or of a type forming around a central spindle and adapted for subsequent removal when the complete swingable rear portion 120 is opened in order to reload the camera.

The fully diffusion-printed extreme end portion of the image-receiving sheet material 74 as it feeds around the pressure idler roller 72 in the process of being ejected through the egress slot means 114, passes an applicator means, generally designated at 122, which may comprise a cylindrical roller 124 retained by a peened-over lip positioned slightly beyond the center point of the cylindrical roller 124 and acting in a dispensing manner very similar to a conventional ball-point pen in that whenever the freshly-printed surface 88 of the image-receiving sheet material 74 rolls between the pressure idler roller 72 and the applicator roller 124, the applicatory liquid or jelly-like material 128 is rolled onto the surface 88 and effectively applies a protective finishing coat thereto which may be of a physically protected nature or a chemically protective nature, or both, adapted to protect and maintain the permanency of the image on the surface 88 of the ejected print. The applicator means 122 is removably mounted in the position shown by mounting means 130 and can be removed when the swingable rear portion 120 of the camera is opened, thus making it possible to replace the applicator or to refill same when the protective finishing liquid 128 has been used up.

The previously-mentioned detachment means 106 comprises an electrically energizable rectilinear motor means 132, as is best shown in FIGS. 4 and 8, which may be of the solenoid type or any other suitable type and which has a connecting rod portion 134 connected to a severing knife 136 which slides in slotted guide means 138 between an upper ineffective position and a lower severing or detachment position, as is clearly shown in FIGS. 3 and 4. The lower severing edge 140 of the severing knife 136 may be serrated, as is best shown in FIG. 4 or may have various other types of edge means suitable for the severing function to which it is to be put. As will be described hereinafter, other types of operating motor means may be employed in lieu thereof. The solenoid-type operating motor 132 and the severing knife 136 are effectively spring-biased into the upper ineffective position by biasing spring means, such as is indicated at 142 in FIG. 8, which is not shown in the other views for reasons of drawing simplicity and clarity.

All of the electrical components are adapted to be supplied with power from a suitable source of electrical energy which, in the example illustrated, comprises battery means 144, which preferably may be of a type characterized by long operating life and preferably, in certain forms of the invention may be rechargeable. In fact, a recharging unit of a conventional type which modifies ordinary alternating current of the conventional supply voltage (often 115 volt, 60 cycle A-C) and which then rectifies same and applies same to the batteries to be recharged may merely be plugged into a conventional wall outlet for recharging the batteries, which may be done either outside or inside of the camera. In the latter case, a suitable electrical connector means may be provided in the back of the camera to facilitate this.

The battery 144, in the example illustrated, is shown positioned in a chamber 146 in the swingable rear portion 120 of the camera to facilitate easy mounting, removal, and replacement thereof, when desired, and is adapted to be connected by the electric circuit means or wires 148 to the detachment means 106, the four switch means 104, 150, 152, 154, to the time-delay relay 108 and to the auxiliary motor means 110 in the manner best illustrated in FIG. 8. It will be understood from careful examination of FIG. 8 that when the manually operable knob 92 of the main transport means 90 is rotated in a counter-clockwise direction and correspondingly rotates the gear 96, the snap-action two-position switch 104 will be moved from the position shown in FIG. 8 where it connects to the lead 160 to the alternate position where it connects to the lead 162, which is already connected by the other switch 150 to the lead 164, which goes directly to the coil 166 of the solenoid-type linear actuating motor 132 and which, therefore, immediately causes the solenoid motor 132 to be actuated and to attract downwardly the armature 168 and to therefore force downwardly the connecting rod 134 and the severing knife 136 so as to sever the joined sheets of material 40 and 74 in the manner clearly illustrated in FIGS. 3 and 4. This will occur after one complete revolution of the gear 96 has occurred, which should be of a proper size with respect to the other gear 98 and the size of the main driving capstan 60 to cause the proper length of the exposed image-recording material 40 to be fed into the diffusion transfer printing recess or region 64.

Therefore, said operation of the detachment means 106 will occur immediately after the previously exposed image-recording sheet 40 and the superposed image-receiving sheet 74 have been moved into the diffusion transfer printing recess 64, which is the desired operation of the apparatus.

As soon as the servering knife 136 reaches its bottom position, it operates the switch 150 (which is also a two-position snap-action switch) from its position as shown in FIG. 8 into its alternate position where it connects to the other lead 172, which is not energized from the previously-operated switch 104, thus breaking the supply of electrical energy to the coil 166 of the solenoid motor 132 and de-energizing same and allowing the biasing spring 142 to return the severing knife 136 to its upward extreme ineffective position.

At the same time that the severing knife 136 is operated downwardly to perform the detachment operation referred to above, it will also operate the two-position, snap-action switch 152 from its position as shown in FIG. 8 into its alternate position where it connects to the lead 174, which is already connected by the two-position snap-action switch 154 to the time-delay relay means generally indicated at 108, which may be of a predetermined time-delay type or a controllably adjustably time-delay type arranged to have the optimum time-delay period corresponding to the time interval required for most effective diffusion transfer printing of the image-receiving sheet 74 in the diffusion transfer printing region 64. For example, in the case of black-and-white printing, the time delay might be of the order of ten seconds and in the case of color printing, it might be of the order of 60 seconds, although the invention is not specifically so limited.

In any case, the time-delay relay 108 will operate in any of the several manners well-known in the art and, therefore, not disclosed in specific detail, to close the switch 176 after a ten-second delay (or other desired delay) so that the lead 178 will be closed and provide a direct connection from the battery 144 to the auxiliary driving motor 110, which will then begin to rotate and drive the previously-mentioned capstan 70 and cause stripping and separation of the sheets 74 and 40 as previously described and cause the ejection and dispensing of the finished print comprising the extreme end of the printed image-receiving sheet 74.

The motor 110 will be de-energized at the right moment by reason of the fact that, effectively coupled with respect to the drive pulley sheave 180 thereof, is a pin 182 which is adapted to strike a toggle arm 184 of the previously-mentioned snap-action two-position switch 154 so as to cause it to open the circuit lead 174 while closing the other circuit lead 181. This of course de-energizes the time-delay relay 108 and correspondingly releases the temporarily closed switch 176 and allows it to open, which is its normal condition, thus de-energizing the motor 110 at precisely the right moment when the apparatus is in the relationship shown in FIG. 3.

It should be noted that when the gear 96 of the main transport means 90 has been rotated by manual rotation of the knob 92 to the proper extent for causing advancement of the complete area of the just-exposed image-recording sheet 40 from the exposure region 38 into the diffusion transfer printing recess or region 64 and for simultaneously causing the same extent of advancement of the image-receiving sheet material 74 so as to be in super-position with the previously-exposed image-recording sheet portion 40 in said diffusion transfer printing region 64 (which, in the example illustrated, is intended to be accomplished by one complete revolution of said gear 96), the snap-action switch 104 will be operated at the end of the main transporting movement as previously described and this will, in addition to energizing the detachment means 106 as previously described, also energize the jeweled indicator light 216, thus indicating to a person rotating the knob 92 that he should stop same and should not rotate said knob any further.

FIG. 9 is a view similar to FIG. 8 but illustrates a slight modification thereof and, therefore, similar parts are indicated by similar reference numerals, followed by the letter a, however. In FIG. 9 it should be noted that the detachment means operating motor 132a is of a different construction from that illustrated in FIG. 8 and comprises a reversible electric motor 185 driving a spur or pinion gear 187 which is in driving engagement with a toothed rack member 186 which has affixed to the lower end thereof a severing knife 136a similar to that of the FIG. 8 form of the invention. The switching arrangement with respect to one input terminal 188 of the motor 185 is similar to that connected to the upper input terminal of the solenoid motor 132 of FIG. 8 and operates in substantially the same manner and includes in circuit therewith the switches 104a and 150a which are similar to those of the FIG. 8 form of the invention. However, the other motor terminal 190 has no counterpart in the FIG. 8 form of the invention and is connected through a two-position snap-action switch 192 and two parallel leads 194 and 196 and another snap-action, two-position switch 198 to a by-pass lead 200 which by-passes the switch 104a Thre two snap-action switches 192 and 198 just mentioned effectively comprise limit switches and are adapted to be operated by an operating member 202 carried by the rack 186 so that at the end of an upward stroke of the rack 186, it snaps the upper switch 198 from one position to the other and so that at the end of a downward stroke of the rack 186, it snaps the other snap-action switch 192 into its alternate position. Thus it will be seen that this will function to cause the automatic upward retraction of the rack 186 immediately after the completion of each downward stroke thereof and of the severing knife 136a. Otherwise, this modification of the invention is substantially similar to the FIG. 8 form thereof and no further detailed description thereof is thought necessary or desirable.

The FIG. 10 version of the invention is a very slight modification of the FIG. 8 version thereof and, indeed, from the terminal marked 151 in FIG. 8 and marked 151b in FIG. 10, the rest of the circuitry beyond said terminal 151b is identical to that beyond the corresponding terminal 151 of FIG. 8. However, because of the fact that FIG. 10 is a modification of FIG. 8, all of said similar circuitry and components beyond the circuit point 151b are designated by the same reference numerals as employed in FIG. 8 for the corresponding parts, followed by the letter b, however.

In other words, the modification of FIG. 10 lies to the left or forwardly of the circuit point 151b between said point and the terminals of the power supply 144b in said new portion of the circuitry shown in FIG. 10.

It will be noted that an additional motor comprising a first or main electrically energizable driving motor 204 is added to the invention of FIG. 8 and drives the gear 96b, which in turn drives the gear 98b, which in turn drives the main capstan 60b. Said first or main electrically energizable driving motor means 204 is connected through two different two-position snap-action switch means 206 and 208 and two parallel leads 210 and 212 interconnecting said switches 206 and 208 to the power input lead 149b of the electric circuit means 148b, which is adapted to be connected to the power supply battery 144b. Since normally the two snap-action switches 206 and 208 are connected to different ones of the pair of parallel leads 210 and 212, the main driving motor 204 is normally de-energized. However, whenever the switch 206 is manually operated (usually by way of an exterior pushbutton 214 and normally carried by the exterior of the camera as shown in phantom in FIG. 1) into its alternate position from that shown in FIG. 10, the lead 210 will be energized and the motor 204 will be energized and, at the same time, the optional jeweled indicator light 216b will be energized. Thus, it will be seen that all that is necessary after exposure of the image-recording portion 40 in the exposure region 38 of a camera 30 in the manner indicated in FIG. 3, in the FIG. 10 modification of the invention, will be to press the pushbutton 214 momentarily. This will operate the snap-action switch 206 into its other position and cause the main driving motor 204 to rotate the gears 96b and 98b and the capstan 60b until the switch operating pin 218 strikes the toggle arm 220 of the previously-mentioned two-position, snap-action switch 208, thus effectively de-energizing the main driving motor 204 when the exact optimum extent of rotation of driving of the modified main transport means 90b has occurred. It will be noted that the optional jeweled indicator light 216b in the FIG. 10 modification of the invention is an "on" indicating light showing the transporting operation is occurring and, therefore, is slightly different from the jeweled indicator light 216 in the FIG. 8 form of the invention. Therefore, in the FIG. 10 form of the invention, no additional end-of-transporting-movement-indicating jeweled indicator light similar to that shown at 216 in the FIG. 8 form of the invention is needed.

Incidentally, it should be noted that the main transporting movement-initiating switch 206 need not necessarily be manually operated by an exterior pushbutton such as shown at 214 in FIG. 10, but may, if desired, in certain forms of the invention, be directly coupled to the shutter of the camera or the shutter-operating mechanism therefor (usually with a suitable very short time-delay feature incorporated therein) so that operation of the camera shutter control, such as fragmentarily, partially, and somewhat diagrammatically illustrated in FIG. 10A at 222, will effectively comprise an operating arm 214 arranged to operate the snap-action switch 206 immediately after the exposure is completed. In fact, this may be arranged so that the shutter-opening movement of the shutter control 222 does nothing to the switch 206 but so that release of the operating control 222, or its return to its normal position coincident with the return of the camera shutter to closed relationship, can be coupled in a manner such as to operate the switch 206 in a manner fully analogous to the pushbutton 214. Of course, it will be understood that this means that when one takes a picture, immediately after the exposure is completed, the mechanism of the FIG. 10 form of the invention begins to operate without any further initiation thereof being required by the operator of the camera and will continue on through the complete programmed sequence of operations previously described in connection with FIG. 10 until the ejection from the egress slot means, similar to that shown at 114 of the FIGS. 1 and 3 forms of the invention, of the fully-finished print.

FIG. 11 is a view similar in many respects to the FIG. 10 modification of the invention, and similar parts are indicated by similar reference numerals, followed by the letter c, however. It should be noted that all portions in front of or to the left of the circuit point 151c are essentially the same as those of the corresponding part of the circuit and the components to the left of the circuit point 151b in the FIG. 10 form of the invention. However, all circuit portions and components contained therein beyond or to the right of the circuit point 151c of the FIG. 11 modification of the invention, are similar to the circuit points and components to the right of the circuit point 151a of the FIG. 9 form of the invention rather than being similar to the circuit portions and components to the right of the circuit point 151 of the FIG. 8 form of the invention. Otherwise, the FIG. 11 modification of the invention is substantially similar in principle to the FIG. 10 form thereof and comprises a complete processing apparatus for handling all phases of the transporting, processing, and dispensing of a diffusion transfer type print after the initial exposure produced by operating the camera shutter.

Virtually all that has been said above with respect to the FIG. 10 form of the invention and the coupling thereof with respect to the camera shutter, or camera shutter-operating control mechanism, is equally applicable with respect to the FIG. 11 form of the invention.

FIGS. 12–26 inclusive illustrate a further modified form of the invention wherein all of the electrically-operated components of the first several different forms of the invention illustrated in FIGS. 1–8, FIG. 9, FIG. 10, and FIG. 11, are replaced by either manually-operated or mechanically-operated components functioning in substantially the same manner for achieving substantially the same end results. Of course, it should be understood that the particular physical embodiment illustrated in FIGS. 12–26 inclusive is exemplary only of the many possible mechanical arrangements for accomplishing substantially the same results, and all such are intended to be broadly included within the scope of the present invention—the exemplary form illustrated in FIGS. 12–26 inclusive merely being representative thereof but not intended to be construed in a specific limiting sense.

All portions of the FIGS. 12–26 modification of the invention structurally or functionally substantially similar to those of the earlier forms of the invention illustrated in the earlier figures and described in detail hereinbefore are designated by similar reference numerals, followed by the letter d, however. In this modification, it will be noted that the manual actuating knob 92d still rotates the gears 96d and 98d, which in turn still rotate the main driving capstan 60d. However, the knob 92d also rotates another gear 224, which drives a sprocketed chain or sprocket-apertured belt 226, which drives the gear 228 fixed to the auxiliary stub shaft 230 and which, in turn, drives the gear 232 and a gear 234 (which will be described later). The gear 232 drives another sprocket-apertured belt 236, which, at the opposite end, drives another gear 238, which is fixedly mounted on a hollow sleeve 240. The hollow sleeve 240 rotatably receives through the center thereof a shaft 242, which has splined thereto by spline means 244 an engagement member 246, which carries on one annular face thereof a novel type of face ratchet or gear 248, which is adapted for engagement and disengagement with a corresponding mating annular face ratchet or gear 250 carried by the annular flange 252 of the sleeve 240. The engagement member 246 is spring biased away from the sleeve 240 by biasing spring means 254 and positioning pin means 256 so that whenever constraint is absent, the two annular facing ratchets or gears 248 and 250 are disengaged from each other.

The shaft 242 extends into a spring motor housing 258 and is connected as indicated at 260 to a spirally coiled spring 262 effectively comprising a spring motor which has its opposite end connected as indicated at 264 to the fixed spring motor housing 258. Said spring 262 is wound in a spiral clockwise direction from the center connection point 260 to the outer connection point 264, as is best shown in FIG. 22. The purpose of this structure will be described hereinafter.

The other end of the shaft 242 freely rotatably mounts thereon a timer partial gear 266, which is in engagement with the hereafter-mentioned partial gear 282 during a portion of the one complete rotative cycle thereof. The timer gear 266 is provided with a projecting cam follower 268, which is shown as being provided at the end thereof with a ball bearing 270 and which rides in a cam raceway 272 formed in a cam cover plate 274 fixed to the front face of a conventional prior art mechanical timer unit 276. It is understood that the cam raceway 272 is very slightly recessed into the forward surface of the cam plate 274 throughout most of its circular path, except for a short arcuate portion thereof at the right thereof as shown in FIG. 14 where the cam follower 268 is shown extending deeply thereinto. At said location, said cam raceway 272 inclines rearwardly to a much deeper recessed location than elsewhere as best shown at 273 in FIG. 20. This allows the biasing spring 254 to slide the engagement member 246 on the spline means 244 whereby to cause the ball bearing means and raceway means 278 to forcibly abut the forward surface of the timing gear 266 such as to slide it rearwardly on the shaft 242 to an extent such that the annular ratchet gears 248 and 250 are disengaged. This is normally so only when the apparatus is in the position shown in FIGS. 14 and 17.

When the main operating knob 92d of FIG. 18 is manually rotated in a counter-clockwise direction, the belt 226 rotates the gears 228, 232, and 234. This causes the belt 236 to rotate the gear 238 and the sleeve 242. However, for the moment, since the annular ratchet gears 248 and 250 are temporarily disengaged, the rotary motion of the sleeve 240 is not transmitted to the shaft 242, although it will be very shortly as explained hereinbelow.

At the same time that the above action occurs, the rotation of the gear 234 causes rotation of the partial gear 266 by way of the coupling gear 280 and the partial gear 282. This causes the cam follower 268 to rotate relative to the cam raceway 272 and to almost immediately ride up from the deeply recessed portion 273 thereof, in which it is shown positioned in FIGS. 14 and 17, into the less-deeply-recessed portion thereof, as is shown in FIGS. 15 and 18. This immediately forces the gear 266 forwardly into engagement member 246, against the action of the biasing spring 254, until the annular ratchet gears 248 and 250 are engaged. This engagement occurs after only a very small amount of rotation of the shaft 230 has occurred and from that moment on, the rest of the rotative movement of the shaft 230 (which occurs simultaneously with the advancement of the image-recording sheet material 40d and the image-receiving sheet material 74d into the diffusion transfer printing region 64d) is accompanied by rotation of the shaft 242 in unison with the rotation of the shaft 230, also in a counter-clockwise direction as viewed looking in a forward direction axially therealong.

The above-mentioned counter-clockwise rotation of the shaft 242 winds up and tensions the spring motor 262 but does not rotate the shaft 284 in a counter-clockwise direction because of the fact that connected between the shaft 242 and the shaft 284 is a one-way clutch 285 of a resiliently-biased type adatped to allow the transmission therethrough of torque in a clockwise direction of rotation only, while slipping when counter-lcockwise torque is applied thereto by the shaft 242. Furthermore, counter-clockwise rotation of the shaft 284 is positively prevented by the ratchet 286 and the pawl 288 carried by the fixed wall 290. It should be understood that said ratchet and pawl structure 288 and 290 will freely allow clockwise rotation of the shaft 284 but will positively prevent counterclockwise rotation.

The previously-mentioned counter-clockwise rotation of the shaft 242 and the consequent tensioning of the spring motor 262 continues until the belt 226 ceases to rotate the gear 228 because of the fact that manual torque is no longer applied to the operating knob 92d. Tension will be maintained on the spring motor 262 by reason of the fact that the shaft 230 mounts a ratchet 292 which cooperates with a pawl 294 carried by the fixed wall 290 and which allows counter-clockwise rotation of the shaft 230 only and positively prevents clockwise rotation thereof.

Thus it will be understood that when the main operating knob 92d has been rotated the optimum amount (which will be determined in a manner described hereinafter), the spring motor 262 will have been properly tensioned and the sleeve 267 carried by the timing gear 266 and which extends into the timer 276 will have been rotated through approximately 180 degrees, which will set the conventional timer unit 276 for operation by the conventional interior helical spring means, escapement means, balance wheel and staff means, and detented turn-off means with which such conventional prior art timers are provided normally for subsequent return, when released, through said 180 degrees to its initial position, which will take a predetermined period of time which is initially adjusted and set to be that required for optimum diffusion transfer printing.

Upon completion of manual rotation of the knob 92d as mentioned above and with the apparatus substantially in the relationship best shown in FIGS. 16 and 19, the partial gear 282 has moved from the position shown in FIG. 17 into the position shown in FIG. 19 where the non-toothed portion 296 comes into a position adjacent to the gear 266 and, therefore, becomes effectively disengaged therefrom, thus allowing the biasing force thereon exerted by the conventional timer unit 276 to return the 180-degree displaced gear 266 from the position shown in FIGS. 16 and 19 to its normal initial at-rest position, as shown in FIGS. 14 and 17. This return movement of the gear 266 will take a period of time determined by the setting of the conventional timer 276, and at the conclusion thereof, the cam follower 268 drops into the deep portion 273 of the cam raceway 272, allowing the biasing spring 254 to effectively separate the annular ratchet gears 248 and 250, thus effectively rotatively disengaging the sleeve 240 from the shaft 242, which allows the shaft 242 to now begin to turn in a clockwise direction under the action of the spring motor 262, which is transmitted through the one-way clutch 285 and the one-way ratchet and pawl 286 and 288 to the shaft 284, which rotates in a clockwise direction and will drive the auxiliary drive capstan 70d whereby to cause transporting and dispensing movement of the image-recording sheet 40d and the image-receiving sheet 74d from the diffusion transfer printing recess or region 64d in a manner similar to that described in connection with the first form of the invention.

Upon completion of said auxiliary transporting and dispensing rotation of the shaft 284, as determined by the tension on the spring motor 262, or by mechanical rotative travel-limiting means positioned on any portion of the spring motor or shaft 284 outwardly of the one-way clutch 285, the finished print 74d will extend out of the egress slot means 114d in a manner such as that shown in FIG. 13 and can be manually pulled out of the final frictional engagement with the auxiliary drive capstan 70d and the pressure roller 72d. Then it will be found that the apparatus is again in condition for the next subsequent operation thereof, such condition being that shown in FIGS. 14 and 17.

It will be understood that the conventional timer 276 is of substantially the same type as that shown at 276′ in FIG. 21A and that the conventional time-selecting pointer member 300 thereof and the conventional shaft 302 thereof are merely replaced by the timing gear 266 and the sleeve 267, respectively, and the sleeve 267 is made longer so as to extend through the cam plate 274, which is fastened on the front of a conventional timer such as is shown at 276′ in FIG. 21A.

FIG. 20 illustrates in fragmentary perspective the cam raceway 272, but it should be understood that various other camming and/or actuating arrangements for causing engagement and disengagement of the annular ratchet gears 248 and 250 under the control of a conventional timer such as that shown at 276′ in FIG. 21A (with slight modifications as shown in FIG. 2) may be accomplished.

The detachment means indicated generally at 106d is somewhat different from the detachment means 106 of the first form of the invention and, in this case, comprises a severing blade 136d positioned below the diffusion transfer printing recess 64d and normally spring biased downwardly by the spring means 142d and arranged to be forcibly moved upwardly by mechanical actuator means such as is generally designated as 304, as best shown in FIGS. 13 and 26 and which is of a pivotally operable type having an input lever portion 306 for operating same and having an output portion 308 coupled to the severing knife 136d. Said actuator means 304 also includes an operating member, in the example illustrated taking the form of a pin 310 carried by the gear 98d which is adapted to strike the input lever portion 306 once during each revolution thereof whereby to operate the severing knife 136d.

It should be noted that the invention is not to be construed as being limited to the gear sizes shown. Actually, in the FIGS. 12–26 form of the invention, the gear 98d should be of a size such that one rotation thereof will correspond to the advancement of one complete exposure area of the image-recording sheet material 40d. This is actually not the case in the drawing as shown, which is drawn without either appropriate reduction gearing or the proper gear size of the gear 98d for reasons of drawing simplicity and clarity. However, it should be clearly understood that it is to be correlated in the manner just described with the advancement of the image-recording sheet 40d.

In fact, somewhat the same comment as that set forth immediately above can be made with respect to various other power transmission means and mechanical components set forth in the apparatus illustrated in the drawings. They are not to be construed as being limited to the precise dimensions or physical relationships shown, which are selected for purposes of drawing simplicity and clarity rather than for true design accuracy. Therefore, it is to be understood that proper intermediate gearing, usually of a reduction gearing type, may be employed in any of the gear structures disclosed in the drawings for the purpose of bringing about the proper correlation therebetween and thereof with respect to the advancement of one complete exposure frame of the image-recording sheet material.

Also, it should be noted that the rear of the camera may, if desired, be provided with a receiving container for receiving the ejected finished prints.

The mechanically operated form of the invention illustrated in FIGS. 12–26 may have an end-of-main-transporting-movement-indicating means functionally equivalent to the jeweled indicator light 216 of the first form of the invention and this may take many different possible mechanical forms. One such form is indicated generally at 312 and may comprise a modified mechanical counter positioned to be operated by the operating pin 310 or any other equivalent pin carried by either of the gears 96d or 98d or even the knob 92d or positioned elsewhere in the main transport system. In the example illustrated, it comprises the knob 92d, which has been modified to have a number-viewing window 316 positioned for rotation with the knob 92d and arranged so as to have dark regions of the camera surface positioned therebehind until the counter has been operated a distance corresponding to the desired length of the film transporting movement, at which time a white, luminescent, or otherwise very visible camera surface portion 314 may be viewed through the window 316, thus indicating to a person rotating the knob 92d that he should cease further rotation thereof. Also, detent means, such as indicated at 318, may be employed for similar purposes if desired.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

We claim:

1. Photographic apparatus for exposing photosensitive image-recording sheet material and for producing and dispensing prints therefrom on corresponding image-receiving sheet material, comprising: main transport means for transporting a photosensitive photographic image-recording sheet material in longitudinal strip form across a photographic image-recording region within a light-tight camera and into a diffusion transfer printing region and for transporting a diffusion transfer type of image-receiving sheet material in longitudinal strip form into said diffusion transfer printing region in superposed relationship therewith; means for applying to the adjacent superposed portions of the image-recording sheet material and the image-receiving sheet material in the diffusion transfer printing region a diffusion transfer type of processing material for causing diffusion transfer printing of a recorded image from the corresponding portion of the image-recording sheet material onto the image-receiving sheet material within a predetermined time interval; normally inoperative auxiliary sheet material transporting and dispensing means cooperable, upon the initiation of operation thereof, for transporting and dispensing a portion of the image-receiving sheet material which has just received an image from a surface-adjacent portion of the image-recording sheet material into a removal position exterior of the camera; and timer means cooperating with said auxiliary transporting and dispensing means for initiating operation thereof after a predetermined optimum diffusion transfer printing time interval has elapsed.

2. Apparatus as defined in claim 1, including detachment means for effectively detaching the surface-adjacent image-recording and image-receiving portions of sheet material in the diffusion transfer printing region from the remainder thereof in response to the transporting by said main transport means of a predetermined length of previously-exposed image-recording sheet material and a corresponding length of said superposed image-receiving sheet material into said diffusion transfer printing region.

3. Apparatus as defined in claim 2, including travel-correlated detachment-operation-initiating means cooperating with said detachment means for initiating the detachment operation thereof effectively in response to the travel into said diffusion transfer printing region of said predetermined length of the superposed image-recording and image-receiving portions of sheet material.

4. Apparatus as defined in claim 3, wherein said detachment-operation-initiating means comprises limit-switch-operating means adapted to move in a manner correlated with the operation of said main transport means and movement of said superposed image-recording and image-receiving portions of sheet material into the diffusion transfer printing region, and limit switch means positioned in the effective path of travel of said limit-switch-operating means for switch operation after said predetermined length of image-recording and image-receiving portions of sheet material have been transported into the diffusion transfer printing region, said limit switch means being electrically coupled in operating relationship with respect to said detachment means.

5. Apparatus as defined in claim 1, including travel-correlated timer-operation-activating means effectively cooperating with said timer means for initiating the timing operation thereof substantially upon completion of the travel into said diffusion transfer printing region of said predetermined length of the superposed image-recording and image-receiving portions of sheet material.

6. Apparatus as defined in claim 2, including travel-correlated timer-operation-activating means effectively cooperating with said timer means for initiating the timing operation thereof substantially upon completion of the travel into said diffusion transfer printing region of said predetermined length of the superposed image-recording and image-receiving portions of sheet material.

7. Apparatus as defined in claim 3, wherein said timer means cooperates with said detachment means for effective activation thereby and cooperates with said auxiliary transporting and dispensing means for subsequentially initiating operation thereof after said predetermined optimum diffusion transfer printing time interval has elapsed.

8. Apparatus as defined in claim 3, wherein said detachment-operation-initiating means comprises mechanical actuator means having an input portion for operating same and an output portion coupled in actuating relationship with respect to said detachment means for actuating same, and further comprises an operating member driven by and in correspondence with the operation of said main transport means for abutting said input portion of said detachment-operation-initiating means after said predetermined length of each of said image-recording and image-receiving sheet materials has been transported into said diffusion transfer printing region.

9. Apparatus as defined in claim 1, including auxiliary travel-correlated dispensing-operation-termination means effectively correlated with respect to the operation of said auxiliary transporting and dispensing means and the transporting into a removal position exterior of the camera of a predetermined length of said printed image-receiving sheet material for causing the termination of the operation of said auxiliary transporting and dispensing means.

10. Apparatus as defined in claim 2, including auxiliary travel-correlated dispensing-operation-termination means effectively correlated with respect to the operation of said auxiliary transporting and dispensing means and the transporting into a removal position exterior of the camera of a predetermined length of said printed image-receiving sheet material for causing the termination of the operation of said auxiliary transporting and dispensing means.

11. Apparatus as defined in claim 1, including stripping and separating means effectively provided with and positioned adjacent to an egress slot means and operable to effectively strip and separate the used image-recording sheet material as it is transported out of the diffusion transfer printing region and leaving only said image-receiving sheet material in a position for egress through said egress slot means.

12. Apparatus as defined in claim 11, including storage means for receiving and storing the used image-recording sheet material separated from the image-receiving sheet material during the stripping and separating operation.

13. Apparatus as defined in claim 12, wherein said auxiliary transporting and dispensing means includes auxiliary capstan frictional drive means adapted to frictionally engage and drive the joined image-recording and image-receiving portions of sheet material at a position just ahead of said stripping and separating means whereby to cause the separation of said image-receiving sheet material from said image-recording sheet material and the feeding of said separated image-receiving sheet material outwardly through said egress slot means and for causing feeding of the separated image-recording sheet material toward said storage means therefor, and further includes auxiliary electrically energizable auxiliary driving motor means for driving said auxiliary capstan driving means.

14. Apparatus as defined in claim 13, including auxiliary travel-correlated dispensing-operation-termination means effectively correlated with respect to the operation of said auxiliary transporting and dispensing means and the transporting into a removal position exterior of the camera of a predetermined length of said printed image-receiving sheet material for causing the termination of the operation of said auxiliary transporting and dispensing means.

15. Apparatus as defined in claim 14, wherein said dispensing-operation-termination means effectively comprises auxiliary limit switch means operable to de-energize said auxiliary driving electric motor means of said auxiliary transporting and dispensing means after said predetermined length of said severed image-receiving sheet material has been transported from said diffusion transfer printing region into a removal position exterior of the camera for subsequent removal thereof.

16. Apparatus as defined in claim 1, wherein said main transport means includes main capstan frictional drive means adapted to frictionally engage and drive the joined surface-adjacent image-recording and image-receiving portions of sheet material at a position just ahead of the diffusion transfer printing region.

17. Apparatus as defined in claim 2, wherein said main transport means includes main capstan frictional drive means adapted to frictionally engage and drive the joined surface-adjacent image-recording and image-receiving portions of sheet material at a position just ahead of the diffusion transfer printing region, and further includes an electrically energizable main driving motor means for driving said main capstan drive means.

References Cited

UNITED STATES PATENTS

| 2,741,961 | 4/1956 | Anton | 95—14 |
| 2,915,393 | 12/1959 | Fairbank | 95—14 |
| 3,249,434 | 5/1966 | Land et al. | 95—14 |

NORTON ANSHER, *Primary Examiner.*

CHARLES B. FUNK, *Assistant Examiner.*

U.S. Cl. X.R.

95—14